US011978602B2

(12) United States Patent
Shin et al.

(10) Patent No.: US 11,978,602 B2
(45) Date of Patent: May 7, 2024

(54) SWITCH APPARATUS

(71) Applicants: Hyundai Motor Company, Seoul (KR); Kia Corporation, Seoul (KR); NOVATECH Co., Ltd., Yongin-si (KR); ALPS ELECTRIC KOREA CO., LTD., Gwangju (KR)

(72) Inventors: Sang Hoon Shin, Hwaseong-Si (KR); Hoo Sang Lee, Gwangju (KR); Jong Hyun Choi, Gwangju (KR); Dae Woo Park, Gwangju (KR); Youn Tak Kim, Gwangju (KR); Nam I Jo, Gwangju (KR); Choon Teak Oh, Yongin-Si (KR); Hong Jun Choi, Suwon-Si (KR); Kon Hee Chang, Suwon-Si (KR); Woo Joo Ahn, Suwon-Si (KR)

(73) Assignees: Hyundai Motor Company, Seoul (KR); Kia Corporation, Seoul (KR); NOVATECH CO., LTD, Yongin-si (KR); ALPS ELECTRIC KOREA CO., LTD., Gwangju (KR)

( * ) Notice: Subject to any disclaimer, the term of this patent is extended or adjusted under 35 U.S.C. 154(b) by 0 days.

(21) Appl. No.: 17/845,714

(22) Filed: Jun. 21, 2022

(65) Prior Publication Data

US 2023/0114041 A1 Apr. 13, 2023

(30) Foreign Application Priority Data

Oct. 13, 2021 (KR) ........................ 10-2021-0136093

(51) Int. Cl.
*H01H 36/00* (2006.01)

(52) U.S. Cl.
CPC ......... *H01H 36/00* (2013.01); *H01H 2231/00* (2013.01)

(58) Field of Classification Search
CPC ............. H01H 13/84; H01H 2215/042; H01H 2231/00–2231/052
(Continued)

(56) References Cited

U.S. PATENT DOCUMENTS 4,599,826 A 7/1986 Podoprigora
7,550,686 B2 6/2009 Girke et al.
(Continued)

FOREIGN PATENT DOCUMENTS

JP 2001-312949 A 11/2001
JP 2004-349039 A 12/2004
(Continued)

*Primary Examiner* — Ramon M Barrera
(74) *Attorney, Agent, or Firm* — MORGAN, LEWIS & BOCKIUS LLP

(57) ABSTRACT

A switch apparatus, includes: a base module including a base case, and a moving magnet movably mounted in the base case; and a manipulation module including a manipulation case, and a first magnet fixedly mounted in the manipulation case, wherein the moving magnet moves between a hold position and a releasable position, the hold position refers to a position in which the manipulation module is held onto the base module as an attractive force acts between the moving magnet and the first magnet, and the releasable position refers to a position in which the manipulation module is releasable from the base module as a repulsive force acts between the moving magnet and the first magnet.

12 Claims, 13 Drawing Sheets

(58) Field of Classification Search
USPC .................................................. 335/205–207
See application file for complete search history.

(56) References Cited

U.S. PATENT DOCUMENTS

| | | | | |
|---|---|---|---|---|
| 7,724,114 | B2 * | 5/2010 | Fullerton ................ | H01P 11/00 310/90.5 |
| 8,217,742 | B2 | 7/2012 | Trudeau et al. | |

FOREIGN PATENT DOCUMENTS

| | | | |
|---|---|---|---|
| KR | 10-1881339 | B | 8/2018 |
| KR | 10-2020-0018856 | A | 2/2020 |
| KR | 10-2022-0097696 | A | 7/2022 |

* cited by examiner

SWITCH APPARATUS

CROSS-REFERENCE TO RELATED APPLICATION

The present application claims priority to Korean Patent Application No. 10-2021-0136093, filed on Oct. 13, 2021, the entire contents of which is incorporated herein for all purposes by this reference.

BACKGROUND OF THE PRESENT DISCLOSURE

Field of the Present Disclosure

The present disclosure relates to a switch apparatus, and more particularly, to a switch apparatus including a manipulation module manipulated by a user and releasably attached to a base module.

Description of Related Art

A vehicle includes switches for performing various functions such as lock/unlock of doors, audio, video, navigation (AVN), heating, ventilation, and air conditioning (HVAC), seat adjustment, and lighting control.

With the rapid progress of electronic control technology, various apparatuses of the vehicle that used to be operated by mechanical methods may be driven by electric/electronic methods for a driver's convenience and safety, and vehicle systems are being advanced and technologically-enhanced.

In recent years, research and development of switches that allow the driver to easily perform various functions of the vehicle have been continuously conducted. For example, as a vehicle seat is rotatable in a passenger compartment of an autonomous vehicle, research is continuing to ensure accessibility and operability of the switches that can perform various functions of the vehicle.

The information included in this Background of the present disclosure section is only for enhancement of understanding of the general background of the present disclosure and may not be taken as an acknowledgement or any form of suggestion that this information forms the prior art already known to a person skilled in the art.

BRIEF SUMMARY

Various aspects of the present disclosure are directed to providing a switch apparatus including a manipulation module which may be easily attached to and released from a base module in accordance with changes in magnetic force.

According to an aspect of the present disclosure, a switch apparatus may include: a base module including a base case, and a moving magnet movably mounted in the base case; and a manipulation module including a manipulation case, and a first magnet fixedly mounted in the manipulation case. The moving magnet may move between a hold position and a releasable position. The hold position may refer to a position in which the manipulation module is held onto the base module as an attractive force acts between the moving magnet and the first magnet, and the releasable position may refer to a position in which the manipulation module is releasable from the base module as a repulsive force acts between the moving magnet and the first magnet.

A magnetic force acting between the manipulation module and the base module may be changed by the movement of the moving magnet, which may allow the manipulation module to be easily released from or securely attached to the base module.

A magnetic axis of the moving magnet may be parallel to a plane of the base case, and the moving magnet may include a first portion and a second portion having opposite polarities.

The first magnet may be positioned above a movement path of the moving magnet, the first magnet may include a first portion and a second portion having opposite magnetic polarities to each other, and a magnetic axis of the first magnet may be perpendicular to the magnetic axis of the moving magnet.

The first portion of the first magnet and the first portion of the moving magnet may have a same magnetic polarity, and the second portion of the first magnet and the second portion of the moving magnet may have a same magnetic polarity.

The first magnet may be positioned above the movement path of the moving magnet, and the movement of the moving magnet may cause the attractive force and the repulsive force to selectively act between the first magnet and the moving magnet. Thus, the manipulation module may be securely attached to or easily released from the base module.

The second portion of the first magnet may face the movement path of the moving magnet, and when the moving magnet is in the hold position, the second portion of the first magnet may face the first portion of the moving magnet.

When the moving magnet is in the hold position, the second portion of the first magnet and the first portion of the moving magnet may have opposite magnetic polarities so that the attractive force may be generated between the first magnet and the moving magnet, and accordingly the manipulation module may be securely attached to the base module.

When the moving magnet is in the releasable position, the second portion of the first magnet may face the second portion of the moving magnet.

When the moving magnet is in the releasable position, the second portion of the first magnet and the second portion of the moving magnet may have a same magnetic polarity so that the repulsive force may be generated between the first magnet and the moving magnet, and accordingly the manipulation module may be easily released from the base module.

The base module may further include a first electromagnet and a second electromagnet disposed to face each other on a first side and a second side of the moving magnet. The first electromagnet may face the first portion of the moving magnet, and the second electromagnet may face the second portion of the moving magnet. As a direction of a current applied to the first electromagnet and the second electromagnet is changed, a polarity of the first electromagnet and a polarity of the second electromagnet may be changed.

The first electromagnet and the second electromagnet may be disposed to face each other on a first side and a second side of the moving magnet, respectively, and the magnetic polarity of the first electromagnet and the magnetic polarity of the second electromagnet may be changed to thereby induce the movement of the moving magnet.

When the magnetic polarity of the first electromagnet and the magnetic polarity of the second electromagnet are changed to be a same as the magnetic polarity of the first portion of the moving magnet, the moving magnet may move to the hold position.

As the magnetic polarity of the first electromagnet and the magnetic polarity of the second electromagnet are changed to be a same as the magnetic polarity of the first portion of the moving magnet, the moving magnet may move to the hold position, and accordingly the manipulation module may be securely attached to the base module.

When the magnetic polarity of the first electromagnet and the magnetic polarity of the second electromagnet are changed to be a same as the magnetic polarity of the second portion of the moving magnet, the moving magnet may move to the releasable position.

As the magnetic polarity of the first electromagnet and the magnetic polarity of the second electromagnet are changed to be a same as the magnetic polarity of the second portion of the moving magnet, the moving magnet may move to the releasable position, and accordingly the manipulation module may be easily released from the base module.

The base module may include a spring and an electromagnet disposed to face each other on a first side and a second side of the moving magnet. The spring may face the first portion of the moving magnet, and the electromagnet may face the second portion of the moving magnet.

By selectively using a spring force of the spring and a magnetic force of the electromagnet, the moving magnet may move selectively to the hold position and the releasable position.

When the electromagnet is deenergized, the moving magnet may move to the hold position due to the spring force of the spring.

When the magnetic force of the electromagnet is not generated, the moving magnet may remain in the hold position due to the spring force of the spring, and accordingly the manipulation module may be securely attached to the base module.

When the electromagnet is energized, the moving magnet may move to the releasable position due to the magnetic force of the electromagnet.

When the magnetic force of the electromagnet is generated, the moving magnet may move to the releasable position due to the magnetic force of the electromagnet, and accordingly the manipulation module may be easily released from the base module.

The base module may further include a stationary magnet spaced from the moving magnet, and the stationary magnet may be fixedly mounted in the base module. The manipulation module may further include a second magnet positioned above the stationary magnet, and the second magnet may be fixedly mounted in the manipulation module. An attractive force may be continuously generated between the second magnet and the stationary magnet.

As the attractive force is continuously generated between the second magnet and the stationary magnet, the attractive force may act between the manipulation module and the base module, stably maintaining the attachment of the manipulation module and the base module.

According to an exemplary embodiment of the present disclosure, a magnetic axis of the second magnet may be perpendicular to a magnetic axis of the stationary magnet.

According to another exemplary embodiment of the present disclosure, a magnetic axis of the second magnet may be parallel to or is aligned with a magnetic axis of the stationary magnet.

By making various arrangements of the second magnet and the stationary magnet, the attractive force between the second magnet and the stationary magnet may be stably generated.

The methods and apparatuses of the present disclosure have other features and advantages which will be apparent from or are set forth in more detail in the accompanying drawings, which are incorporated herein, and the following Detailed Description, which together serve to explain certain principles of the present disclosure.

Figure 1:
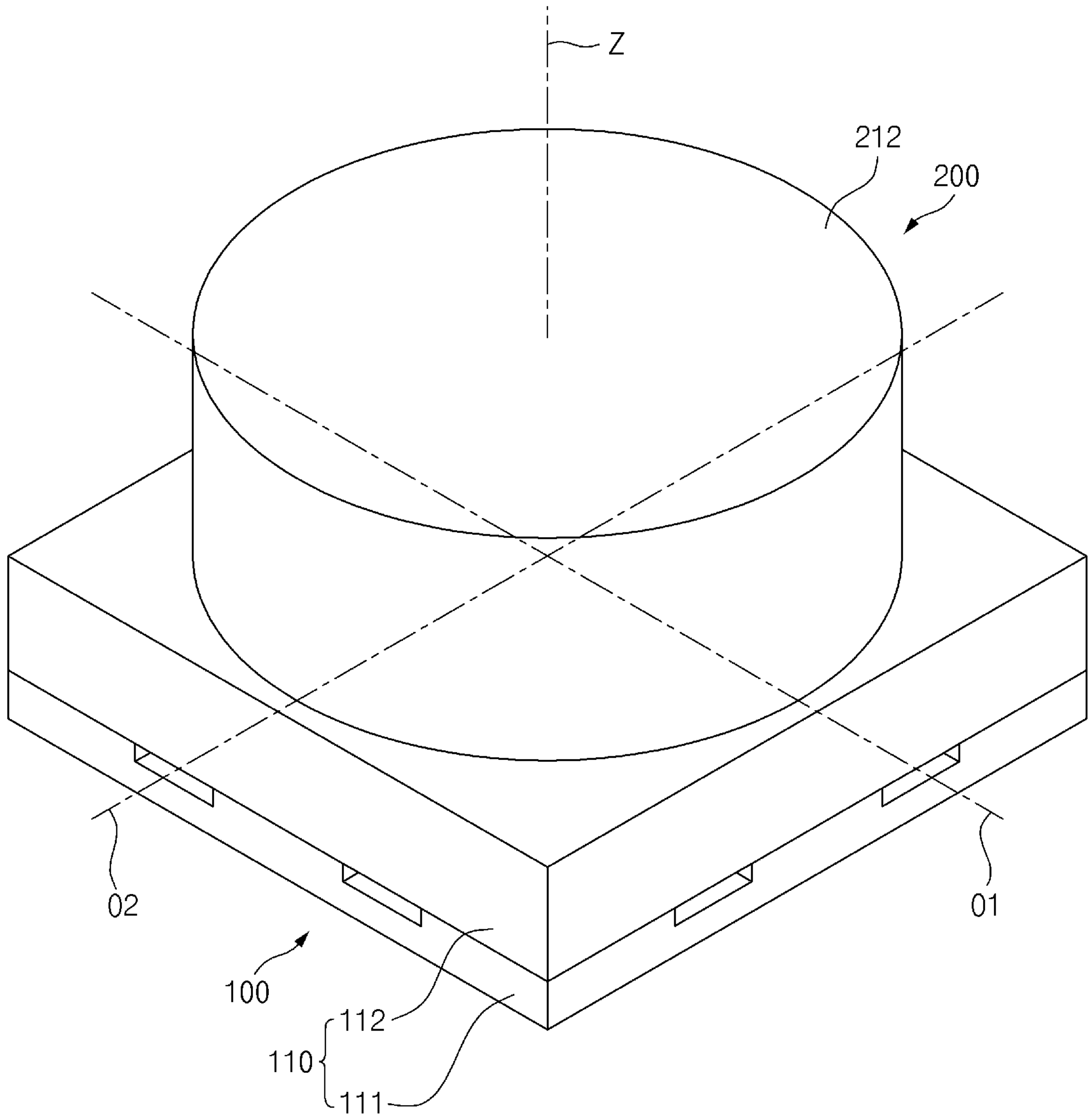
FIG. 1 illustrates a perspective view of a switch apparatus according to an exemplary embodiment of the present disclosure.

It may be understood that the appended drawings are not necessarily to scale, presenting a somewhat simplified representation of various features illustrative of the basic principles of the present disclosure. The specific design features of the present disclosure as included herein, including, for example, specific dimensions, orientations, locations, and shapes will be determined in part by the particularly intended application and use environment.

In the figures, reference numbers refer to the same or equivalent parts of the present disclosure throughout the several figures of the drawing.

DETAILED DESCRIPTION

Reference will now be made in detail to various embodiments of the present disclosure(s), examples of which are illustrated in the accompanying drawings and described below. While the present disclosure(s) will be described in conjunction with exemplary embodiments of the present disclosure, it will be understood that the present description is not intended to limit the present disclosure(s) to those exemplary embodiments of the present disclosure. On the other hand, the present disclosure(s) is/are intended to cover not only the exemplary embodiments of the present disclosure, but also various alternatives, modifications, equivalents and other embodiments, which may be included within the spirit and scope of the present disclosure as defined by the appended claims.

Hereinafter, various exemplary embodiments of the present disclosure will be described in detail with reference to the accompanying drawings. In the drawings, the same reference numerals will be used throughout to designate the same or equivalent elements. Furthermore, a detailed description of well-known techniques associated with the present disclosure will be ruled out in order not to unnecessarily obscure the gist of the present disclosure.

Terms such as first, second, A, B, (a), and (b) may be used to describe the elements in exemplary embodiments of the present disclosure. These terms are only used to distinguish one element from another element, and the intrinsic features, sequence or order, and the like of the corresponding elements are not limited by the terms. Unless otherwise defined, all terms used herein, including technical or scientific terms, have the same meanings as those generally understood by those with ordinary knowledge in the field of art to which the present disclosure belongs. Such terms as those defined in a generally used dictionary are to be interpreted as having meanings equal to the contextual meanings in the relevant field of art, and are not to be interpreted as having ideal or excessively formal meanings unless clearly defined as having such in the present application.

Referring to FIG. 1, a switch apparatus according to an exemplary embodiment of the present disclosure may include a base module 100, and a manipulation module 200 releasably attached to the base module 100 in accordance with variations in magnetic force.

The base module 100 may be mounted in various positions of a vehicle. For example, the base module 100 may be mounted on a center console, a door trim, a rear seat console, or the like. The base module 100 may be electrically and/or mechanically connected to various apparatuses and/or systems of the vehicle. For example, the base module 100 may be electrically and/or mechanically connected to various apparatuses and/or systems of the vehicle such as a door latch mechanism, an outside mirror adjustment mechanism, a seat adjustment mechanism, a heating, ventilation, and air conditioning (HVAC) system, and a lighting system.

Figure 2:
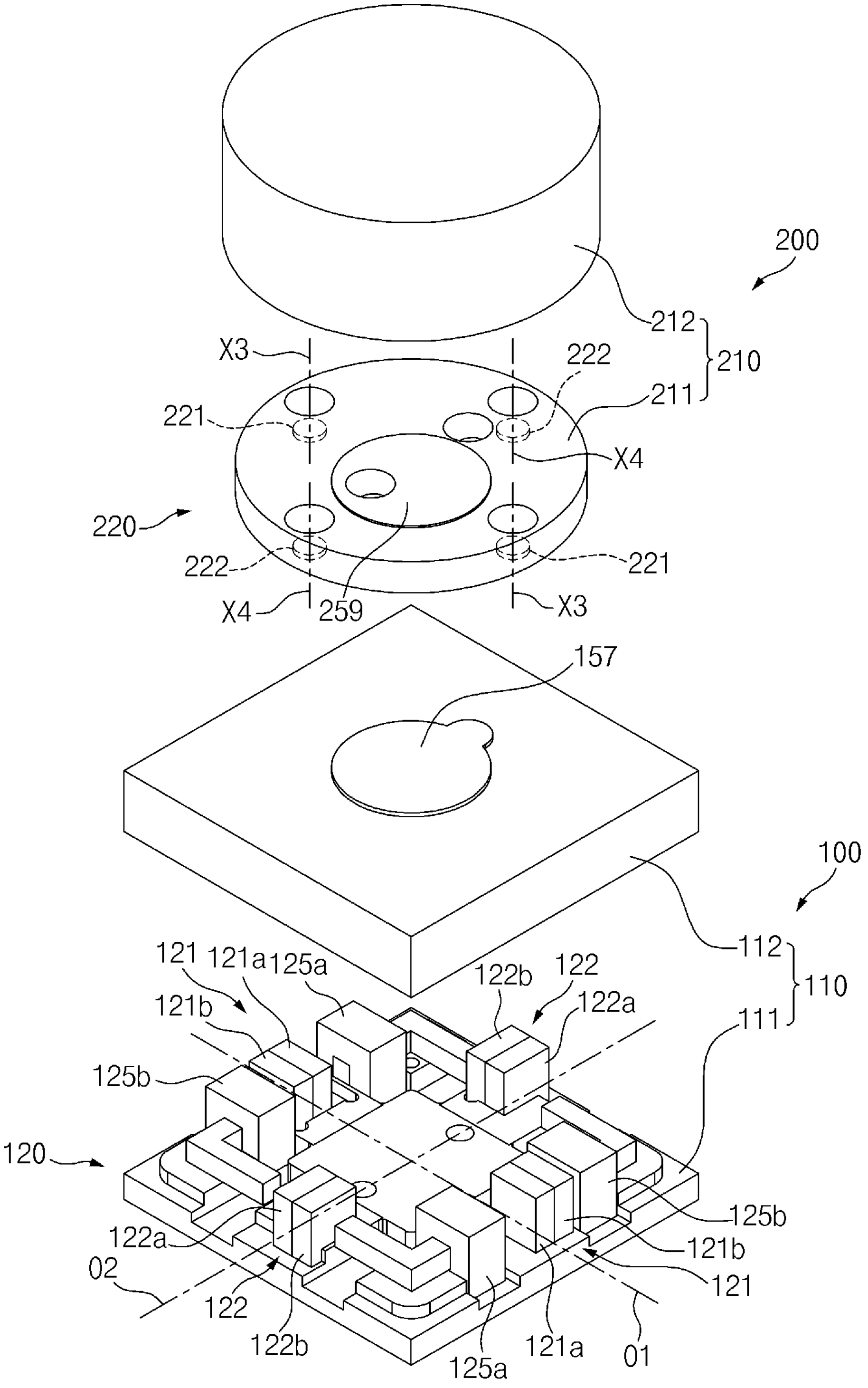
FIG. 2 illustrates an exploded perspective view of a switch apparatus according to an exemplary embodiment of the present disclosure.

The base module 100 may include a base case 110, and a base-side magnet set 120 received in the base case 110. Referring to FIG. 2, the base case 110 may include a base body 111, and a base cover 112 covering the base body 111. The base-side magnet set 120 may be mounted on the base body 111, and the base cover 112 may cover the base body 111 so that the base-side magnet set 120 may be received in the base case 110.

The base-side magnet set 120 may include a moving magnet 121 movably mounted on the base body 111.

Figure 7:
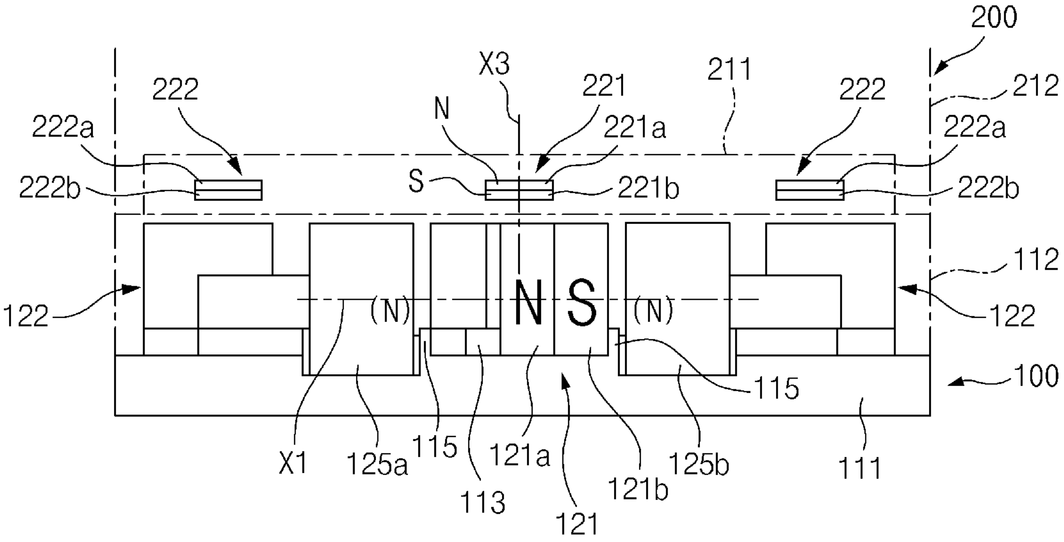
FIG. 7 illustrates a relationship between a base-side magnet set and a first magnet of a manipulation module in a switch apparatus according to an exemplary embodiment of the present disclosure, in a state in which a moving magnet is in a hold position.
Figure 8:
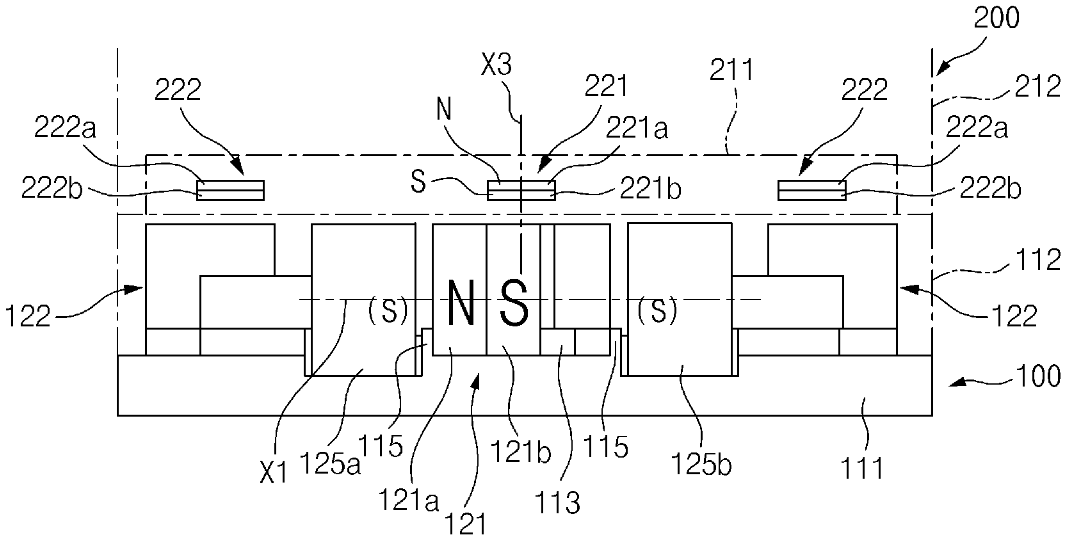
FIG. 8 illustrates a relationship between a base-side magnet set and a first magnet of a manipulation module in a switch apparatus according to an exemplary embodiment of the present disclosure, in a state in which a moving magnet is in a releasable position.

Referring to FIGS. 7 and 8, a magnetic axis X1 of the moving magnet 121 may extend in parallel to a plane of the base body 111 of the base case 110. The moving magnet 121 may include a first portion **121*a* having a first polarity, and a second portion 121*b* having a second polarity. The first polarity and the second polarity may be opposite to each other. According to an exemplary embodiment of the present disclosure, as illustrated in FIGS. 7 and 8, the first portion 121*a* of the moving magnet 121 may be a north pole, and the second portion 121*b* of the moving magnet 121 may be a south pole. According to another exemplary embodiment of the present disclosure, the first portion 121*a* of the moving magnet 121 may be a south pole, and the second portion 121*b* of the moving magnet 121 may be a north pole. A plane of the first portion 121*a* and a plane of the second portion 121*b* may be perpendicular to the magnetic axis X1 of the moving magnet 121. That is, the magnetic axis X1 of the moving magnet 121 may extend along a normal direction perpendicular to the plane of the first portion 121*a* and the plane of the second portion 121*b***.

Referring to FIGS. 7 and 8, the base-side magnet set 120 may include a first electromagnet **125*a* and a second electromagnet 125*b* facing each other with the moving magnet 121 interposed therebetween. That is, the first electromagnet 125*a* and the second electromagnet 125*b* may be disposed to face each other on a first side and a second side of the moving magnet 121. The first electromagnet 125*a* may face the first portion 121*a* of the moving magnet 121, and the second electromagnet 125*b* may face the second portion 121*b* of the moving magnet 121**.

When a current flows in a forward or reverse direction, an end face of the first electromagnet **125*a* facing the first portion 121*a* of the moving magnet 121 and an end face of the second electromagnet 125*b* facing the second portion 121*b* of the moving magnet 121 may have a same magnetic polarity. As the direction of the current flowing through each of the electromagnets 125*a* and 125*b* is changed, the magnetic polarity of each of the electromagnets 125*a* and 125*b* may be changed. As the polarities of the electromagnets 125*a* and 125*b* are changed, the moving magnet 121 may move toward any one of the first electromagnet 125*a* and the second electromagnet 125*b***, and be attached to or close to the corresponding electromagnet.

Figure 3:
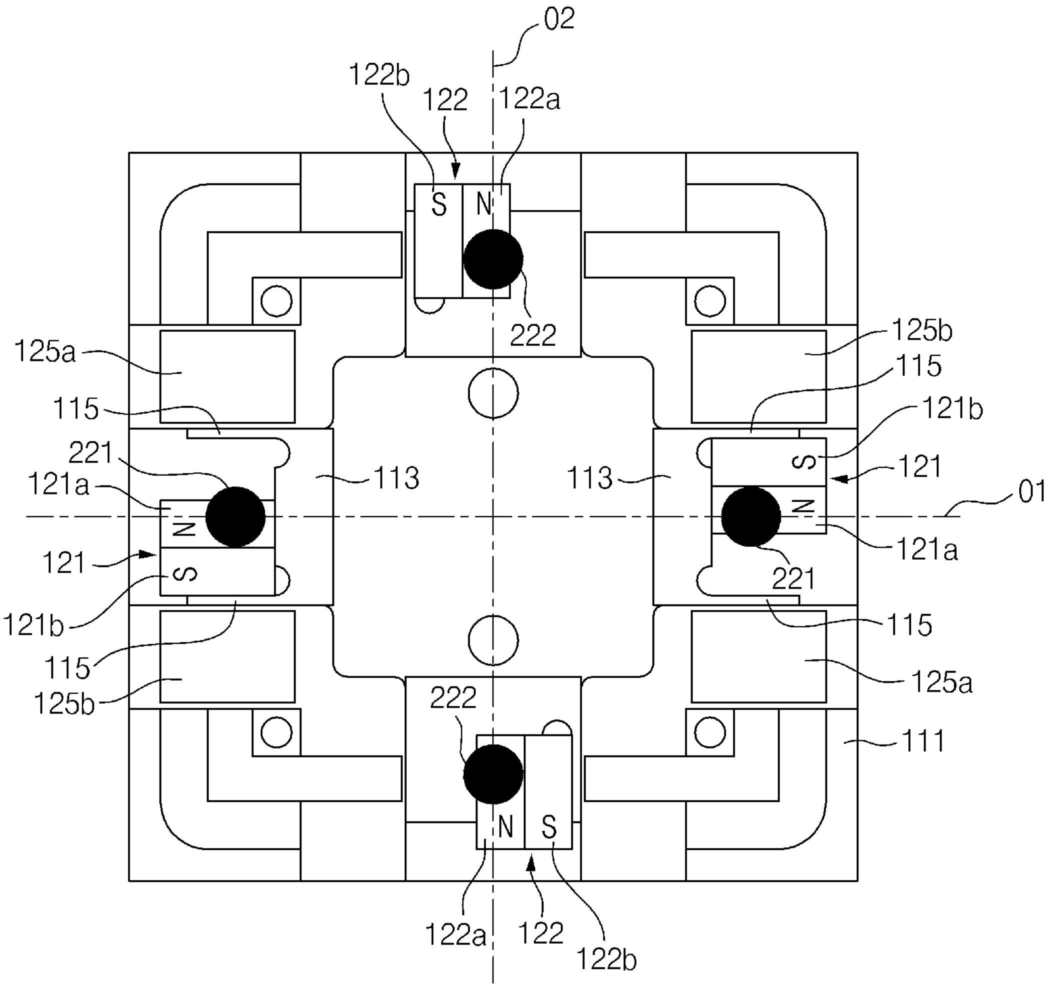
FIG. 3 illustrates a plan view of a base-side magnet set of a base module and a manipulation-side magnet set of a manipulation module in a switch apparatus according to an exemplary embodiment of the present disclosure, in a state in which a moving magnet is in a hold position.
Figure 4:
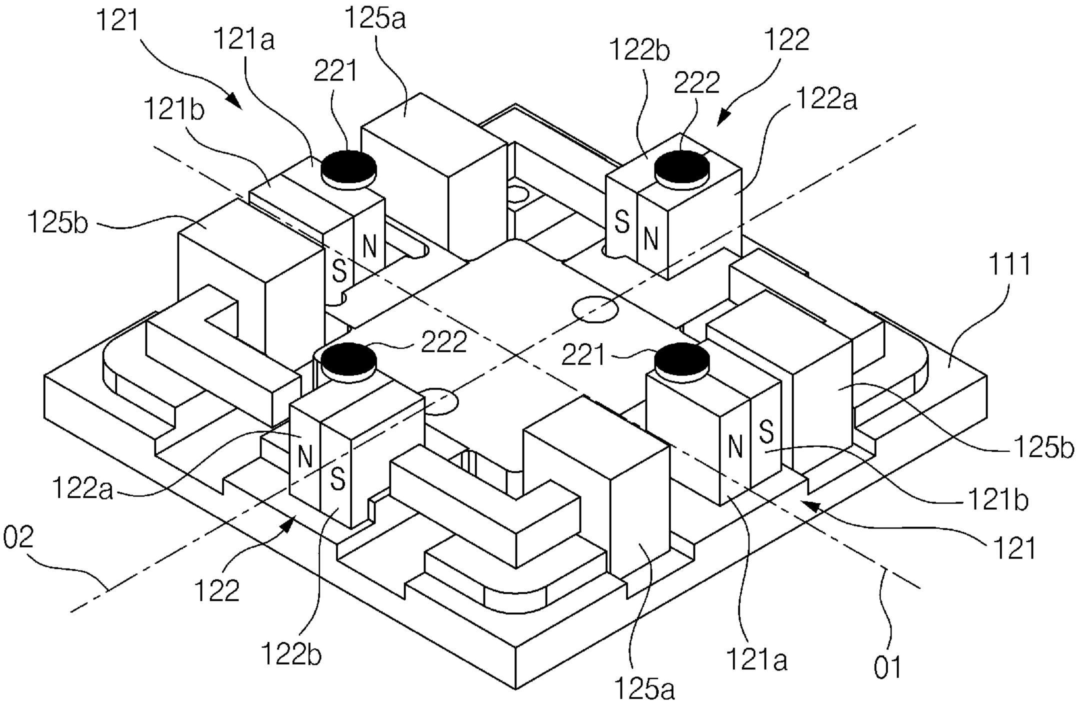
FIG. 4 illustrates a perspective view of a base-side magnet set of a base module and a manipulation-side magnet set of a manipulation module in a switch apparatus according to an exemplary embodiment of the present disclosure, in a state in which a moving magnet is in a hold position.

Referring to FIGS. 3, 4, and 7, when the magnetic polarity of the end face of the first electromagnet **125*a* facing the first portion 121*a* and the magnetic polarity of the end face of the second electromagnet 125*b* facing the second portion 121*b* are changed to the first polarity which is the same as that of the first portion 121*a* of the moving magnet 121, the first portion 121*a* of the moving magnet 121 and the end face of the first electromagnet 125*a* facing the first portion 121*a* may have a same magnetic polarity, and accordingly a repulsive force may be generated between the first portion 121*a* of the moving magnet 121 and the first electromagnet 125*a*, and the second portion 121*b* of the moving magnet 121 and the end face of the second electromagnet 125*b* facing the second portion 121*b* may have the opposite polarities, and accordingly an attractive force may be generated between the second portion 121*b* of the moving magnet 121 and the second electromagnet 125***b*. Thus, the moving magnet 121 may move toward the second electromagnet 125*b*, and the moving magnet 121 may be attached to or close to the second electromagnet 125*b*. That is, the moving magnet 121 may be attracted to the second electromagnet 125*b*. Here, a position in which the moving magnet 121 is attracted to the second electromagnet 125*b* will be defined as a hold position below.

Figure 5:
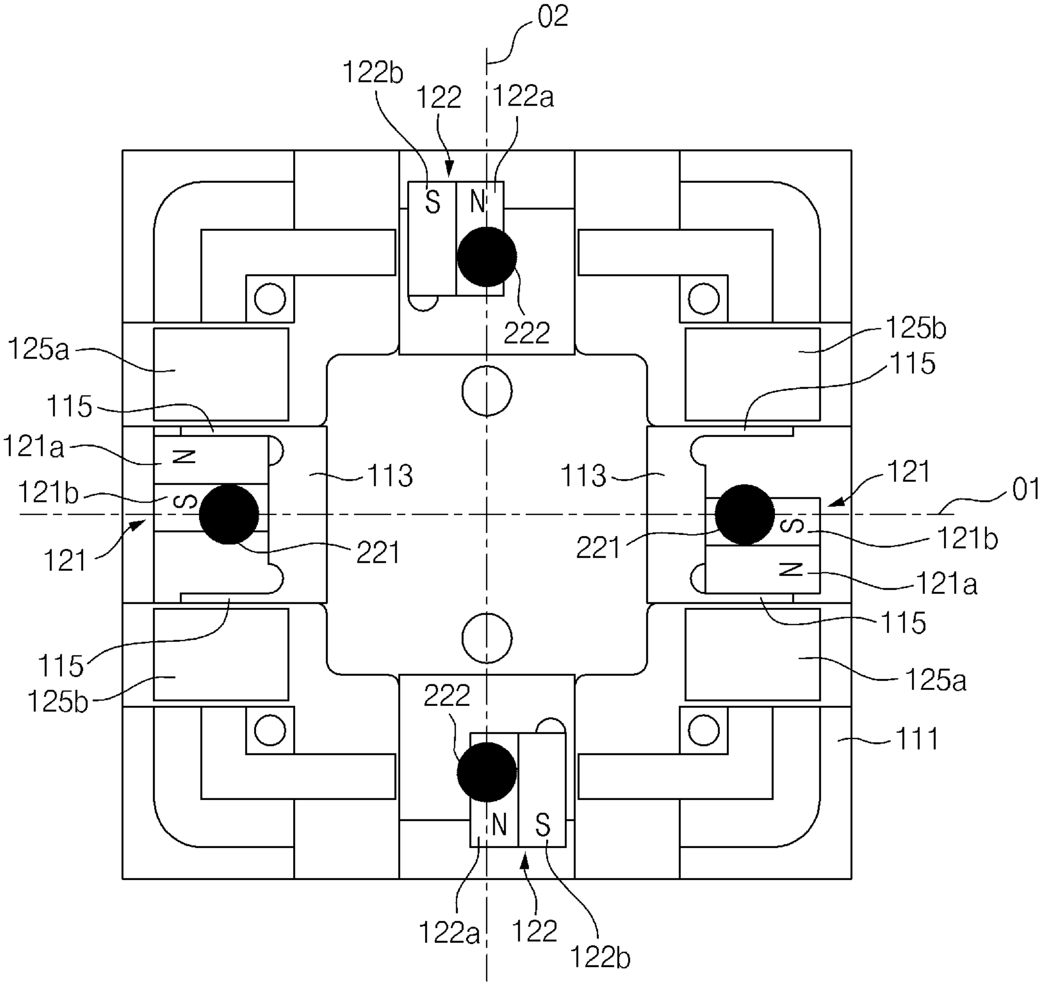
FIG. 5 illustrates a plan view of a base-side magnet set of a base module and a manipulation-side magnet set of a manipulation module in a switch apparatus according to an exemplary embodiment of the present disclosure, in a state in which a moving magnet is in a releasable position.
Figure 6:
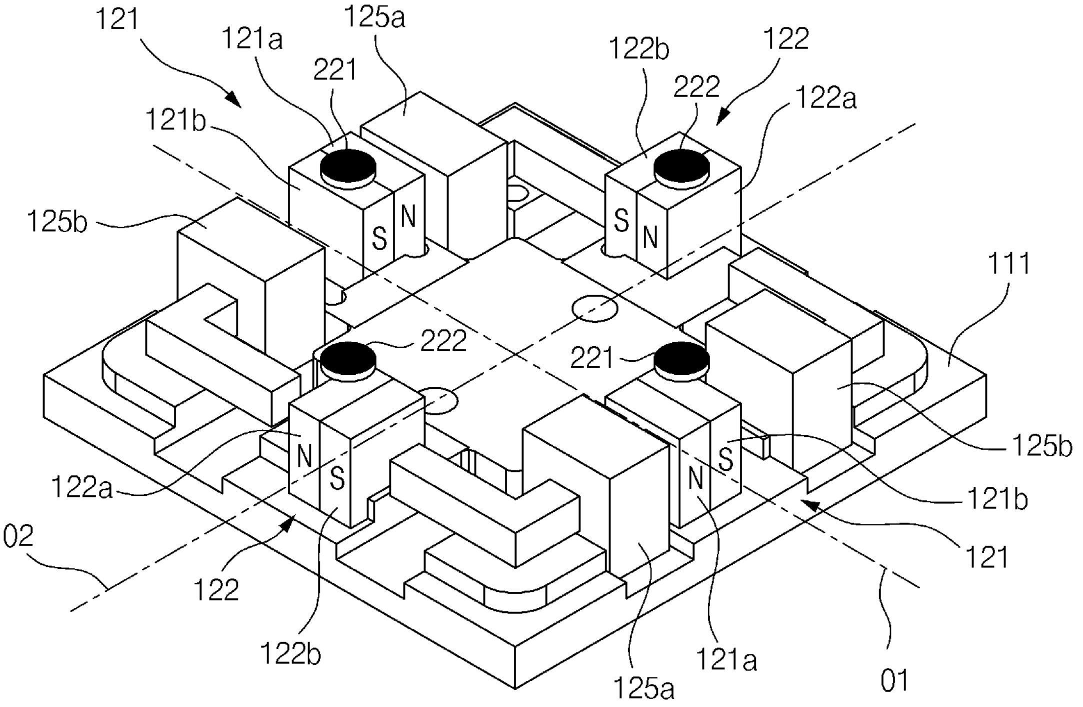
FIG. 6 illustrates a perspective view of a base-side magnet set of a base module and a manipulation-side magnet set of a manipulation module in a switch apparatus according to an exemplary embodiment of the present disclosure, in a state in which a moving magnet is in a releasable position.

Referring to FIGS. 5, 6, and 8, when the magnetic polarity of the end face of the first electromagnet 125*a* facing the first portion 121*a* and the magnetic polarity of the end face of the second electromagnet 125*b* facing the second portion 121*b* are changed to the second polarity which is the same as that of the second portion 121*b* of the moving magnet 121, the first portion 121*a* of the moving magnet 121 and the end face of the first electromagnet 125*a* facing the first portion 121*a* may have the opposite polarities, and accordingly an attractive force may be generated between the first portion 121*a* of the moving magnet 121 and the first electromagnet 125*a*, and the second portion 121*b* of the moving magnet 121 and the end face of the second electromagnet 125*b* facing the second portion 121*b* may have a same magnetic polarity, and accordingly a repulsive force may be generated between the second portion 121*b* of the moving magnet 121 and the second electromagnet 125*b*. Thus, the moving magnet 121 may move toward the first electromagnet 125*a*, and the moving magnet 121 may be attached to or close to the first electromagnet 125*a*. That is, the moving magnet 121 may be attracted to the first electromagnet 125*a*. Here, a position in which the moving magnet 121 is attracted to the first electromagnet 125*a* will be defined as a releasable position below.

Referring to FIGS. 3 to 8, the base body 111 may further include a guide member 113 defining a movement path of the moving magnet 121. The guide member 113 may have two restricting projections 115 whereby the position of the moving magnet 121 is restricted to the hold position and the releasable position. Thus, the position of the moving magnet 121 may be restricted to the hold position and the releasable position by the restricting projections 115 of the guide member 113.

The base-side magnet set 120 may further include a stationary magnet 122 fixed to the base body 111. The stationary magnet 122 may be sufficiently spaced from the moving magnet 121 so that it may not be affected by a magnetic field of the moving magnet 121.

Figure 11:
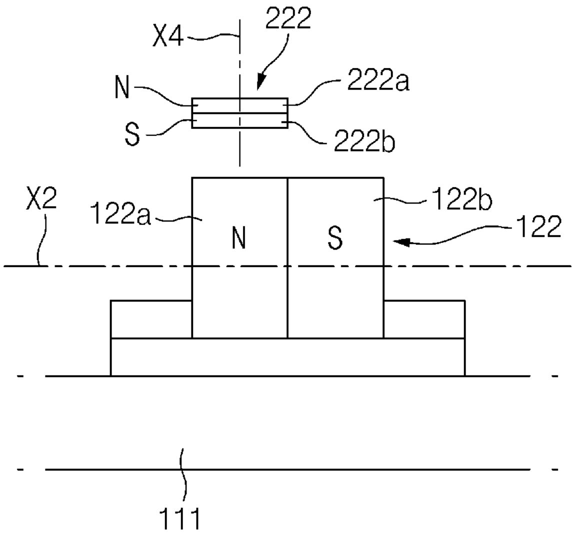
FIG. 11 illustrates a relationship between a stationary magnet of a base-side magnet set and a second magnet of a manipulation module in a switch apparatus according to an exemplary embodiment of the present disclosure.

Referring to FIG. 11, a magnetic axis X2 of the stationary magnet 122 may extend in parallel to the plane of the base body 111. The stationary magnet 122 may include a first portion 122*a* having a first polarity, and a second portion 122*b* having a second polarity. The first polarity and the second polarity may be opposite to each other. According to an exemplary embodiment of the present disclosure, as illustrated in FIG. 11, the first portion 122*a* of the stationary magnet 122 may be a north pole, and the second portion 122*b* of the stationary magnet 122 may be a south pole. According to another exemplary embodiment of the present disclosure, the first portion 122*a* of the stationary magnet 122 may be a south pole, and the second portion 122*b* of the stationary magnet 122 may be a north pole. A plane of the first portion 122*a* and a plane of the second portion 122*b* may be perpendicular to the magnetic axis X2 of the stationary magnet 122. That is, the magnetic axis X2 of the stationary magnet 122 may extend along a normal direction perpendicular to the plane of the first portion 122*a* and the plane of the second portion 122*b*.

According to an exemplary embodiment of the present disclosure, the first polarity of the first portion 122*a* of the stationary magnet 122 may be the same as the first polarity of the first portion 121*a* of the moving magnet 121, and the second polarity of the second portion 122*b* of the stationary magnet 122 may be the same as the second polarity of the second portion 121*b* of the moving magnet 121. The magnetic axis X1 of the moving magnet 121 and the magnetic axis X2 of the stationary magnet 122 may extend horizontally.

The manipulation module 200 may include a manipulation case 210 and a manipulation-side magnet set 220 received in the manipulation case 210. Referring to FIG. 2, the manipulation case 210 may include a support 211, and a manipulation body 212 covering the support 211. The manipulation-side magnet set 220 may be mounted on the support 211, and the manipulation body 212 may cover the support 211 so that the manipulation-side magnet set 220 may be received in manipulation case 210.

According to an exemplary embodiment of the present disclosure, the support 211 may be releasably attached to the base cover 112 of the base module 100 in accordance with changes in magnetic force between the manipulation-side magnet set 220 and the base-side magnet set 120. When the support 211 is attached to the base cover 112 of the base module 100 by an attractive force between the manipulation-side magnet set 220 and the base-side magnet set 120, the support 211 may be retained stationary with respect to the base module 100. The manipulation body 212 may be rotatably mounted with respect to the support 211 through bearing, bushing, and/or the like. The manipulation body 212 may be rotatable about its rotation axis Z. Thus, the manipulation module 200 may perform various operations of various apparatuses through the rotation of the manipulation body 212.

The manipulation-side magnet set 220 may include a first magnet 221 fixed to the support 211, and the first magnet 221 may be positioned above the moving magnet 121 of the base module 100.

Referring to FIGS. 7 and 8, a magnetic axis X3 of the first magnet 221 may extend along a normal direction perpendicular to a plane of the support 211. The first magnet 221 may include a first portion 221*a* having a first polarity, and a second portion 221*b* having a second polarity. The first polarity and the second polarity may be opposite to each other. According to an exemplary embodiment of the present disclosure, as illustrated in FIGS. 7 and 8, the first portion 221*a* of the first magnet 221 may be a north pole, and the second portion 221*b* of the first magnet 221 may be a south pole. According to another exemplary embodiment of the present disclosure, the first portion 221*a* of the first magnet 221 may be a south pole, and the second portion 221*b* of the first magnet 221 may be a north pole. A plane of the first portion 221*a* and a plane of the second portion 221*b* may be perpendicular to the magnetic axis X3 of the first magnet 221. That is, the magnetic axis X3 of the first magnet 221 may extend along a normal direction perpendicular to the plane of the first portion 221*a* and the plane of the second portion 221*b*.

Referring to FIGS. 7 and 8, the first polarity of the first portion 221*a* of the first magnet 221 may be the same as the first polarity of the first portion 121*a* of the moving magnet 121, and the second polarity of the second portion 221*b* of the first magnet 221 may be the same as the second polarity of the second portion 121*b* of the moving magnet 121.

The first magnet 221 may be positioned above the movement path of the moving magnet 121. The second portion

221*b* of the first magnet 221 of the manipulation module 200 may face the movement path of the moving magnet 121 of the base module 100. When the moving magnet 121 moves between the first electromagnet 125*a* and the second electromagnet 125*b*, at least one of the first portion 121*a* and the second portion 121*b* of the moving magnet 121 may face the first magnet 221 of the manipulation module 200.

Referring to FIG. 7, when a current flows in a forward direction, the first electromagnet 125*a* and the second electromagnet 125*b* may have the first polarity (N pole) which is the same as that of the first portion 121*a* of the moving magnet 121, and accordingly the second portion 121*b* of the moving magnet 121 may move toward the second electromagnet 125*b*, and the second portion 221*b* of the first magnet 221 of the manipulation module 200 may face the first portion 121*a* of the moving magnet 121 of the base module 100. Because the second portion 221*b* of the first magnet 221 of the manipulation module 200 and the first portion 121*a* of the moving magnet 121 of the base module 100 have the opposite polarities, an attractive force may be generated between the second portion 221*b* of the first magnet 221 of the manipulation module 200 and the first portion 121*a* of the moving magnet 121 of the base module 100.

Referring to FIG. 8, when a current flows in a reverse direction, the first electromagnet 125*a* and the second electromagnet 125*b* may have the second polarity (S pole) which is the same as that of the second portion 121*b* of the moving magnet 121, and accordingly the second portion 121*b* of the moving magnet 121 may move toward the first electromagnet 125*a*, and the second portion 221*b* of the first magnet 221 of the manipulation module 200 may face the second portion 121*b* of the moving magnet 121 of the base module 100. Because the second portion 221*b* of the first magnet 221 of the manipulation module 200 and the second portion 121*b* of the moving magnet 121 of the base module 100 have a same magnetic polarity, a repulsive force may be generated between the second portion 221*b* of the first magnet 221 of the manipulation module 200 and the second portion 121*b* of the moving magnet 121 of the base module 100.

As described above, the moving magnet 121 may move between the hold position and the releasable position. The hold position (see FIGS. 3, 4, and 7) refers to a position in which the manipulation module 200 is held onto the base module 100 as the attractive force acts between the moving magnet 121 and the first magnet 221 of the manipulation module 200, and the releasable position (see FIGS. 5, 6, and 8) refers to a position in which the manipulation module 200 is releasable from the base module 100 as the repulsive force acts between the moving magnet 121 and the first magnet 221 of the manipulation module 200.

When the moving magnet 121 is in the hold position, the second portion 221*b* of the first magnet 221 of the manipulation module 200 may face the first portion 121*a* of the moving magnet 121 of the base module 100, and accordingly the attractive force may be generated between the second portion 221*b* of the first magnet 221 of the manipulation module 200 and the first portion 121*a* of the moving magnet 121 of the base module 100 so that the manipulation module 200 may remain attached to the base module 100.

When the moving magnet 121 is in the releasable position, the second portion 221*b* of the first magnet 221 of the manipulation module 200 may face the second portion 121*b* of the moving magnet 121 of the base module 100, and accordingly the repulsive force may be generated between the second portion 221*b* of the first magnet 221 of the manipulation module 200 and the second portion 121*b* of the moving magnet 121 of the base module 100 so that the manipulation module 200 may be releasable from the base module 100.

According to an exemplary embodiment of the present disclosure, the first electromagnet 125*a* and the second electromagnet 125*b* may include a magnetic core and a coil wound around the magnetic core. When a current flows through the coil in one direction, a magnetic field may be formed in the first electromagnet 125*a* and the second electromagnet 125*b*. That is, the first electromagnet 125*a* and the second electromagnet 125*b* may be magnetized to have a predetermined polarity. In a case in which the magnetic core is made of a ferromagnetic material such as iron, the first electromagnet 125*a* and the second electromagnet 125*b* may be magnetized when the current flows in one direction thereof. Thereafter, even when the current does not flow through the first electromagnet 125*a* and the second electromagnet 125*b*, the first electromagnet 125*a* and the second electromagnet 125*b* may remain magnetized due to residual magnetism until the current flows in the opposite direction thereof. That is, after the current flows through the first electromagnet 125*a* and the second electromagnet 125*b* in a predetermined direction, the moving magnet 121 may remain in the hold position or the releasable position until the current flows in the opposite direction thereof.

Figure 9:
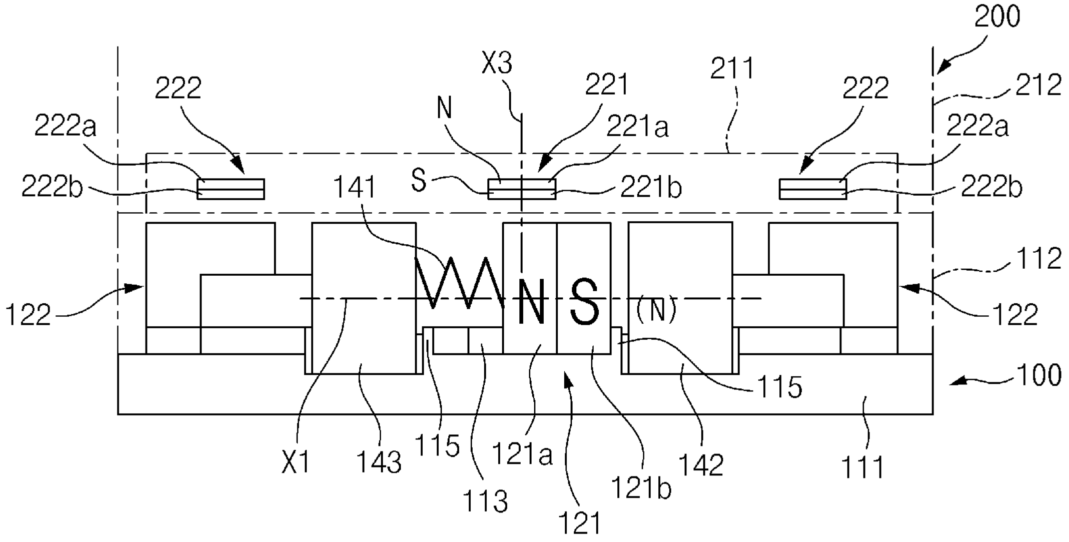
FIG. 9 illustrates a relationship between a base-side magnet set and a first magnet of a manipulation module in a switch apparatus according to another exemplary embodiment of the present disclosure, in a state in which a moving magnet is in a hold position.
Figure 10:
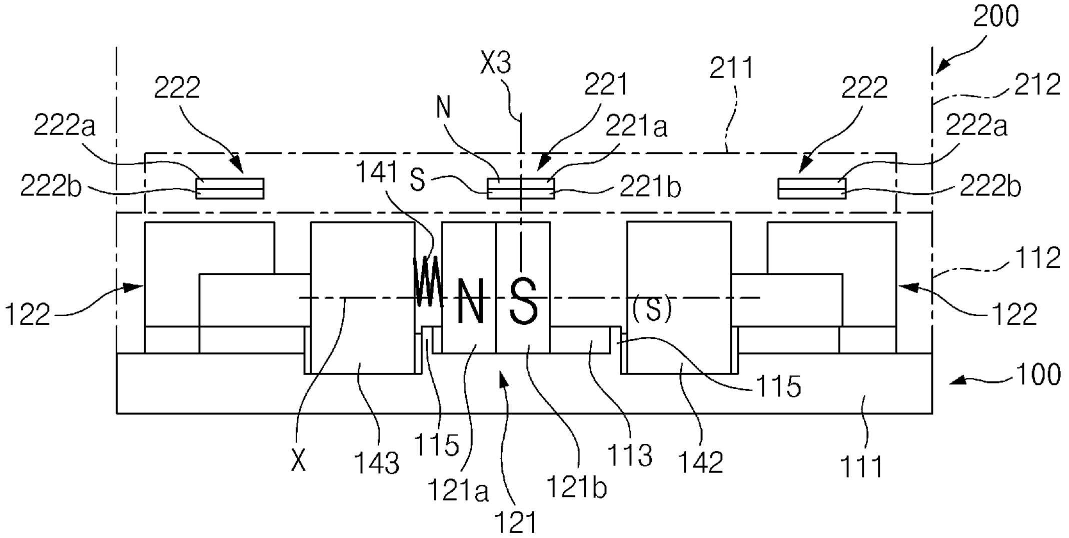
FIG. 10 illustrates a relationship between a base-side magnet set and a first magnet of a manipulation module in a switch apparatus according to another exemplary embodiment of the present disclosure, in a state in which a moving magnet is in a releasable position.

FIG. 9 and FIG. 10 illustrate a base-side magnet set according to another exemplary embodiment of the present disclosure. Referring to FIG. 9 and FIG. 10, the base-side magnet set according to another exemplary embodiment of the present disclosure may include a spring 141 and an electromagnet 142 with the moving magnet 121 interposed therebetween. That is, the spring 141 and the electromagnet 142 may be disposed to face each other on a first side and a second side of the moving magnet 121 so that the moving magnet 121 may move selectively between the hold position and the releasable position due to a spring force of the spring 141 and a magnetic force of the electromagnet 142.

The spring 141 may provide the spring force causing the moving magnet 121 to be biased toward the hold position. The spring 141 may be located between a retainer 143 and the first portion 121*a* of the moving magnet 121, and the retainer 143 may be disposed to face the electromagnet 142. A first end portion of the spring 141 may be supported to the retainer 143, and a second end portion of the spring 141 may be supported to the first portion 121*a* of the moving magnet 121.

Referring to FIG. 9, as the spring 141 provides an elastic force pushing the moving magnet 121 toward the electromagnet 142 (when the electromagnet 142 is deenergized), the moving magnet 121 may be biased toward the electromagnet 142, and accordingly the first portion 121*a* of the moving magnet 121 may face the second portion 221*b* of the first magnet 221 of the manipulation module 200, and an attractive force may be generated between the first portion 121*a* of the moving magnet 121 and the second portion 221*b* of the first magnet 221. That is, as the spring 141 causes the moving magnet 121 to be biased toward the hold position, the attractive force may be generated between the moving magnet 121 and the first magnet 221 of the manipulation module 200, and thus the manipulation module 200 may remain attached to the base module 100.

Referring to FIG. 10, when a current flows through the electromagnet 142 to cause the electromagnet 142 to have a same magnetic polarity as the second polarity of the second portion 121*b* of the moving magnet 121 (when the electromagnet 142 is energized), a repulsive force may be generated between the electromagnet 142 and the second portion 121*b* of the moving magnet 121. When the generated repulsive force overcomes the spring force of the spring 141, the moving magnet 121 may move toward the retainer 143. Accordingly, the second portion 121*b* of the moving magnet 121 may face the second portion 221*b* of the first magnet 221 of the manipulation module 200, and a repulsive force may be generated between the second portion 121*b* of the moving magnet 121 and the second portion 221*b* of the first magnet 221. That is, as the electromagnet 142 causes the moving magnet 121 to be biased toward the releasable position, the repulsive force may be generated between the moving magnet 121 and the first magnet 221 of the manipulation module 200, and thus the manipulation module 200 may be releasable from the base module 100.

The first portion 121*a* of the moving magnet 121 may directly contact with the spring 141, and the second portion 121*b* of the moving magnet 121 may face the electromagnet 142. Furthermore, the electromagnet 142 may be energized to have a same magnetic polarity as the second polarity of the second portion 121*b* of the moving magnet 121.

The manipulation-side magnet set 220 may further include a second magnet 222 fixed to the support 211, and the second magnet 222 may be fixedly positioned above the stationary magnet 122 of the base module 100.

Referring to FIG. 2, a magnetic axis X4 of the second magnet 222 may extend along a normal direction perpendicular to the plane of the support 211. The second magnet 222 may include a first portion 222*a* having a first polarity, and a second portion 222*b* having a second polarity. The first polarity and the second polarity may be opposite to each other. According to an exemplary embodiment of the present disclosure, as illustrated in FIG. 11, the first portion 222*a* of the second magnet 222 may be a north pole, and the second portion 222*b* of the second magnet 222 may be a south pole. According to another exemplary embodiment of the present disclosure, the first portion 222*a* of the second magnet 222 may be a south pole, and the second portion 222*b* of the second magnet 222 may be a north pole. A plane of the first portion 222*a* and a plane of the second portion 222*b* may be perpendicular to the magnetic axis X4 of the second magnet 222. That is, the magnetic axis X4 of the second magnet 222 may extend along a normal direction perpendicular to the plane of the first portion 222*a* and the plane of the second portion 222*b*.

According to an exemplary embodiment of the present disclosure, the first polarity of the first portion 222*a* of the second magnet 222 may be the same as the first polarity of the first portion 122*a* of the stationary magnet 122 of the base module 100, and the second polarity of the second portion 222*b* of the second magnet 222 may be the same as the second polarity of the second portion 122*b* of the stationary magnet 122 of the base module 100.

According to an exemplary embodiment of the present disclosure, the first polarity of the first portion 222*a* of the second magnet 222 may be the same as the first polarity of the first portion 221*a* of the first magnet 221, and the second polarity of the second portion 222*b* of the second magnet 222 may be the same as the second polarity of the second portion 221*b* of the first magnet 221. Referring to FIG. 2, the magnetic axis X3 of the first magnet 221 and the magnetic axis X4 of the second magnet 222 may extend vertically.

Referring to FIG. 11, the second portion 222*b* of the second magnet 222 may be disposed to face the first portion 122*a* of the stationary magnet 122 of the base module 100. Accordingly, an attractive force may always be generated between the second magnet 222 of the manipulation module 200 and the stationary magnet 122 of the base module 100. The magnetic axis X4 of the second magnet 222 may be perpendicular to the magnetic axis X2 of the stationary magnet 122.

Figure 12:
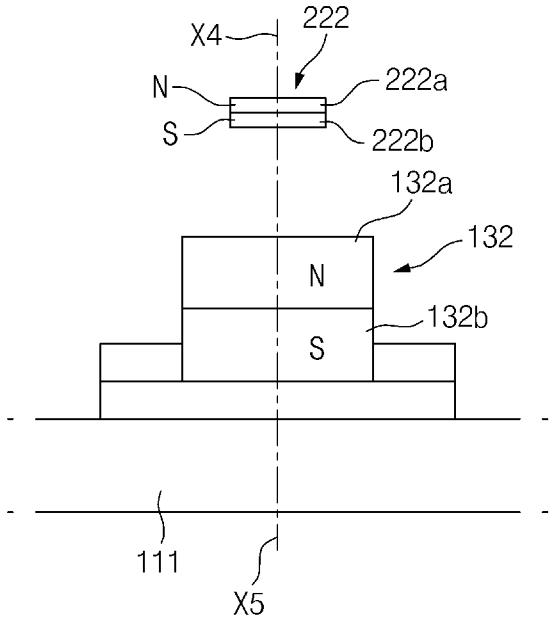
FIG. 12 illustrates a relationship between a stationary magnet of a base-side magnet set and a second magnet of a manipulation module in a switch apparatus according to another exemplary embodiment of the present disclosure.

FIG. 12 illustrates a stationary magnet 132 of a base-side magnet set according to another exemplary embodiment of the present disclosure. Referring to FIG. 12, a magnetic axis X5 of the stationary magnet 132 may extend along a normal direction perpendicular to the plane of the base body 111. Accordingly, the magnetic axis X4 of the second magnet 222 of the manipulation module 200 may be aligned with or parallel to the magnetic axis X5 of the stationary magnet 132 of the base module 100. The second portion 222*b* of the second magnet 222 may be disposed to face a first portion 132*a* of the stationary magnet 132 of the base module 100. Accordingly, an attractive force may always be generated between the second magnet 222 of the manipulation module 200 and the stationary magnet 132 of the base module 100.

Referring to FIGS. 1 to 6, the base module 100 and the manipulation module 200 may have a first common horizontal axis O1 and a second common horizontal axis O2, and the first common horizontal axis O1 and the second common horizontal axis O2 may be parallel to the plane of the base body 111 and the plane of the support 211. The first common horizontal axis O1 may be perpendicular to the second common horizontal axis O2.

Referring to FIGS. 2 to 6, the base-side magnet set 120 may include a pair of moving magnets 121, and the pair of moving magnets 121 may be spaced from each other along the first common horizontal axis O1. Each moving magnet 121 may be movably mounted on a corresponding edge portion of the base body 111. The pair of moving magnets 121 may be arranged on the opposite sides with respect to the second common horizontal axis O2. Referring to FIG. 3, FIG. 4, FIG. 5 and FIG. 6, the first portion 121*a* of the moving magnet 121 on the left side of each figure and the first portion 121*a* of the moving magnet 121 on the right side of each figure may face in the opposite direction with respect to the first common horizontal axis O1.

Referring to FIGS. 2 to 6, the base-side magnet set 120 may include a pair of stationary magnets 122, and the pair of stationary magnets 122 may be spaced from each other along the second common horizontal axis O2. Each stationary magnet 122 may be fixedly mounted on a corresponding edge portion of the base body 111. The pair of stationary magnets 122 may be arranged on the opposite sides with respect to the first common horizontal axis O1. Referring to FIG. 3, FIG. 4, FIG. 5 and FIG. 6, the first portion 122*a* of the stationary magnet 122 on the upper side of each figure and the first portion 122*a* of the stationary magnet 122 on the lower side of each figure may face in the opposite direction with respect to the second common horizontal axis O2.

Referring to FIGS. 2 to 6, the manipulation-side magnet set 220 may include a pair of first magnets 221, and the pair of first magnets 221 may be spaced from each other along the first common horizontal axis O1. Each first magnet 221 may be fixedly mounted on a corresponding edge portion of the support 211. The pair of first magnets 221 may be disposed on the opposite sides with respect to the second common horizontal axis O2. Referring to FIG. 3, FIG. 4, FIG. 5 and FIG. 6, the first magnet 221 on the left side of each figure may be aligned with the first magnet 221 on the right side of each figure along the first common horizontal axis O1.

Referring to FIGS. 2 to 6, the manipulation-side magnet set 220 may include a pair of second magnets 222, and the pair of second magnets 222 may be spaced from each other along the second common horizontal axis O2. Each second magnet 222 may be fixedly mounted on a corresponding edge portion of the support 211. The pair of second magnets 222 may be arranged on the opposite sides with respect to the first common horizontal axis O1. Referring to FIG. 3, FIG. 4, FIG. 5 and FIG. 6, the second magnet 222 on the upper side of each figure may be aligned with the second magnet 222 on the lower side of each figure along the second common horizontal axis O2.

As described above, the pair of moving magnets 121 and the pair of stationary magnets 122 may be symmetrically arranged with respect to the common horizontal axes O1 and O2 perpendicular to each other, and the pair of first magnets 221 and the pair of second magnets 222 may be symmetrically arranged with respect to the common horizontal axes O1 and O2 perpendicular to each other so that the manipulation module 200 may be securely attached to the base module 100 or be easily released from the base module 100.

The manipulation module 200 may be attached to or be released from the base module 100 in accordance with the magnitude of a resultant force Ft of the magnetic force generated between the base-side magnet set 120 of the base module 100 and the manipulation-side magnet set 220 of the manipulation module 200.

The resultant force Ft of the magnetic force may be the sum of an attractive force F1 generated between the base-side magnet set 120 and the manipulation-side magnet set 220, a repulsive force F2 generated between the base-side magnet set 120 and the manipulation-side magnet set 220, and a weight W of the manipulation module 200 (Ft=F1−F2+W).

When the resultant force Ft is greater than 0 (Ft>0), enough attractive force may act between the base module 100 and the manipulation module 200, holding the manipulation module 200 attached to the base module 100.

When the resultant force Ft is 0 (Ft=0), the attractive force and the repulsive force between the base module 100 and the manipulation module 200 may offset each other, and accordingly the magnetic force may not act between the manipulation module 200 and the base module 100 so that the manipulation module 200 may be easily released from the base module 100. For example, when the moving magnet 121 of the base module 100 is in the releasable position, and the repulsive force generated between the moving magnet 121 of the base module 100 and the first magnet 221 of the manipulation module 200 is equal to the sum of the attractive force generated between the stationary magnet 122 of the base module 100 and the second magnet 222 of the manipulation module 200 and the weight W of the manipulation module 200, the resultant force Ft may become 0.

When the resultant force Ft is less than 0 (Ft<0), enough repulsive force may act between the base module 100 and the manipulation module 200, and accordingly the manipulation module 200 may float from the base module 100 with a slight gap therebetween so that the manipulation module 200 may easily move (rotate) with respect to the base module 100, facilitating various operations of the manipulation module 200. For example, when the moving magnet 121 of the base module 100 is in the releasable position, and the repulsive force generated between the moving magnet 121 of the base module 100 and the first magnet 221 of the manipulation module 200 is greater than the sum of the attractive force generated between the stationary magnet 122 of the base module 100 and the second magnet 222 of the manipulation module 200 and the weight W of the manipulation module 200, the resultant force Ft may be less than 0.

According to an exemplary embodiment of the present disclosure, the manipulation module 200 may include a controller 250, a battery 251, a display 252, a plurality of detectors 253 and 254, a lighting module 255, a communication module 256, a haptic module 257, a wireless charging module 258, and a wireless charging coil 259.

The manipulation module 200 may further include a regulator, and at least one of the components forming the manipulation module 200 may receive a stable voltage (power) from the regulator.

The battery 251 may store electrical energy, and the battery 251 may provide the electrical energy to at least one of the display 252, the plurality of detectors 253 and 254, the lighting module 255, the communication module 256, and the haptic module 257 by the controller 250.

The display 252 may be disposed on a top surface of the manipulation body 212 of the manipulation module 200, and receive touch inputs.

Each of the detectors 253 and 254 may be at least one of an acceleration detector, a gyro detector, a touch detector, and a pressure detector.

The lighting module 255 may provide light on a specific portion of the manipulation module 200.

The communication module 256 may transmit the input of the manipulation module 200 to the base module 100 using wired/wireless communications.

The haptic module 257 may generate vibration of a different pattern according to the combination of the magnitude of vibration and the duration of vibration to tactilely check whether the touch input of the manipulation module 200 is properly input.

The wireless charging module 258 and the wireless charging coil 259 may receive a magnetic field from the base module 100 using an electromagnetic induction phenomenon, and generate a current from the received magnetic field.

The controller 250 of the manipulation module 200 may charge the battery 251 with the current received from the wireless charging module 258, or provide the current to at least one of the display 252, the plurality of detectors 253 and 254, the lighting module 255, the communication module 256, and the haptic module 257.

Furthermore, the controller 250 of the manipulation module 200 may receive a driver's or occupant's input from the display 252 and the plurality of detectors 253 and 254, and transmit the received input to the base module 100 through the communication module 256.

The controller 250 of the manipulation module 200 may control the display 252 and the lighting module 255 to provide visual information to the driver or the occupant, and the controller 250 of the manipulation module 200 may control the haptic module 257 to provide haptic information to the driver or the occupant.

Figure 13:
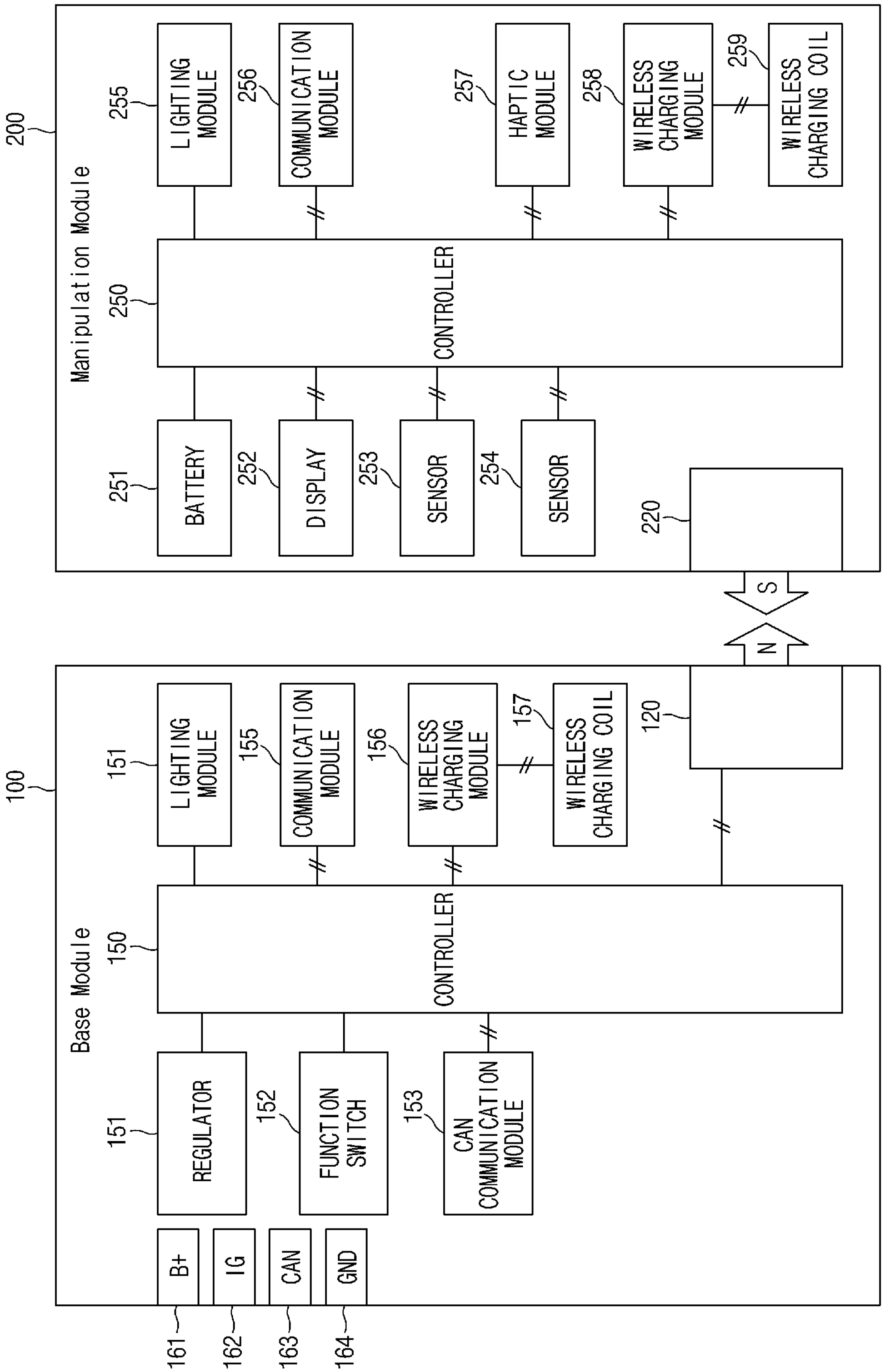
FIG. 13 illustrates the configuration of a switch apparatus according to an exemplary embodiment of the present disclosure.

Referring to FIG. 13, the base module 100 may include a controller 150, a regulator 151, a function switch 152, a CAN communication module 153, a lighting module 154, a communication module 155, a wireless charging module 156, a wireless charging coil 157, and a plurality of ports 161, 162, 163, and 164.

The regulator 151 may provide a stable voltage of a predetermined level to at least one of the function switch 152, the CAN communication module 153, the lighting module 154, the communication module 155, the wireless charging module 156, and the controller 150.

The function switch 152 may include a switch required to control the apparatuses/systems mounted in the vehicle or a switch required to select one of functions of the switch apparatus according to an exemplary embodiment of the present disclosure.

The CAN communication module 153 may transmit and receive data, information, and signals to or from in-vehicle electronic apparatuses.

The lighting module 154 may provide light on a specific portion of the base module 100. For example, the lighting module 154 may provide light on a portion of a top surface of the base cover 112 of the base module 100 to which the manipulation module 200 is attached.

The communication module 155 may transmit and receive data, information, and signals to or from the communication module 256 of the manipulation module 200. Here, wireless communications such as Bluetooth, Near Field Communications (NFC), and Wi-Fi may be used, and/or wired communications such as serial communications may be used.

The wireless charging module 156 and the wireless charging coil 157 may generate a magnetic field by the controller 150 of the base module 100.

The controller 150 of the base module 100 may transmit the driver's or occupant's input received from the function switch 152 and the data and signals of the in-vehicle electronic apparatuses received from the CAN communication module 153 to the manipulation module 200, or may transmit the driver's or occupant's input received from the function switch 152 and information obtained through the driver's or occupant's manipulation of the manipulation module 100 to the in-vehicle electronic apparatuses.

Furthermore, the controller 150 of the base module 100 may transmit the data, information, and signals received from the manipulation module 200 to the in-vehicle electronic apparatuses through the CAN communication module 153.

When the manipulation module 200 comes close to or is attached to the base module 100 (that is, when a distance between the base module 100 and the manipulation module 200 is less than or equal to a predetermined distance), the controller 150 of the base module 100 may control the wireless charging module 156 to generate a magnetic field from the wireless charging coil 157.

The plurality of ports 161, 162, 163, and 164 may include a power terminal 161, an ignition information receiving terminal 162, a CAN communication terminal 163, and a ground terminal 164. Here, some of the plurality of ports 161, 162, 163, and 164 may be electrically connected to at least one of the regulator 151, the function switch 152, the CAN communication module 153, the lighting module 154, the communication module 155, and the wireless charging module 156.

The controller 250 of the manipulation module 200 may determine whether the following condition is satisfied: a releasable condition in which the manipulation module 200 is releasable from the base module 100; and a hold condition in which the manipulation module 200 remains attached to the base module 100. The controller 250 of the manipulation module 200 may determine the releasable condition and the hold condition based on sensing information received from the detectors 253 and 254 of the manipulation module 200.

According to an exemplary embodiment of the present disclosure, any one of the detectors 253 and 254 of the manipulation module 200 may be a pressure detector. When a pressure detected by the pressure detector is higher than or equal to a predetermined pressure, the controller 250 of the manipulation module 200 may determine that the releasable condition is satisfied.

According to another exemplary embodiment of the present disclosure, any one of the detectors 253 and 254 of the manipulation module 200 may be an acceleration detector or a gyro detector. The acceleration detector or the gyro detector may detect a change in the position of the manipulation module 200, and the controller 250 of the manipulation module 200 may determine whether the releasable condition is satisfied based on the sensing information.

According to another exemplary embodiment of the present disclosure, any one of the detectors 253 and 254 of the manipulation module 200 may be a touch detector. When the releasable condition is input to the touch detector, the controller 250 of the manipulation module 200 may determine whether the releasable condition is satisfied based on the touch input.

The controller 250 of the manipulation module 200 may transmit the releasable condition determined by the detectors 253 and 254 of the manipulation module 200 to the controller 150 of the base module 100 through wireless communications or wired communications.

As set forth above, according to exemplary embodiments of the present disclosure, the manipulation module configured to manipulate the operations of various apparatuses may be releasably attached to the base module in accordance with changes in magnetic force. The magnetic force acting between the manipulation module and the base module may be changed by the movement of the moving magnet, which may allow the manipulation module to be easily released from or securely attached to the base module.

Furthermore, the term related to a control device such as "controller", "control apparatus", "control unit", "control device", "control module", or "server", etc refers to a hardware device including a memory and a processor configured to execute one or more steps interpreted as an algorithm structure. The memory stores algorithm steps, and the processor executes the algorithm steps to perform one or more processes of a method in accordance with various exemplary embodiments of the present disclosure. The control device according to exemplary embodiments of the present disclosure may be implemented through a nonvolatile memory configured to store algorithms for controlling operation of various components of a vehicle or data about software commands for executing the algorithms, and a processor configured to perform operation to be described above using the data stored in the memory. The memory and the processor may be individual chips. Alternatively, the memory and the processor may be integrated in a single chip. The processor may be implemented as one or more processors. The processor may include various logic circuits and operation circuits, may process data according to a program provided from the memory, and may generate a control signal according to the processing result.

The control device may be at least one microprocessor operated by a predetermined program which may include a series of commands for carrying out the method included in the aforementioned various exemplary embodiments of the present disclosure.

The aforementioned invention can also be embodied as computer readable codes on a computer readable recording medium. The computer readable recording medium is any data storage device that can store data which may be thereafter read by a computer system and store and execute program instructions which may be thereafter read by a computer system. Examples of the computer readable recording medium include Hard Disk Drive (HDD), solid state disk (SSD), silicon disk drive (SDD), read-only memory (ROM), random-access memory (RAM), CD-ROMs, magnetic tapes, floppy discs, optical data storage devices, etc and implementation as carrier waves (e.g., transmission over the Internet). Examples of the program instruction include machine language code such as those generated by a compiler, as well as high-level language code which may be executed by a computer using an interpreter or the like.

In various exemplary embodiments of the present disclosure, each operation described above may be performed by a control device, and the control device may be configured by a plurality of control devices, or an integrated single control device.

In various exemplary embodiments of the present disclosure, the control device may be implemented in a form of hardware or software, or may be implemented in a combination of hardware and software.

Furthermore, the terms such as “unit”, “module”, etc. Included in the specification mean units for processing at least one function or operation, which may be implemented by hardware, software, or a combination thereof.

For convenience in explanation and accurate definition in the appended claims, the terms “upper”, “lower”, “inner”, “outer”, “up”, “down”, “upwards”, “downwards”, “front”, “rear”, “back”, “inside”, “outside”, “inwardly”, “outwardly”, “interior”, “exterior”, “internal”, “external”, “forwards”, and “backwards” are used to describe features of the exemplary embodiments with reference to the positions of such features as displayed in the figures. It will be further understood that the term “connect” or its derivatives refer both to direct and indirect connection.

The foregoing descriptions of predetermined exemplary embodiments of the present disclosure have been presented for purposes of illustration and description. They are not intended to be exhaustive or to limit the present disclosure to the precise forms disclosed, and obviously many modifications and variations are possible in light of the above teachings. The exemplary embodiments were chosen and described to explain certain principles of the present disclosure and their practical application, to enable others skilled in the art to make and utilize various exemplary embodiments of the present disclosure, as well as various alternatives and modifications thereof. It is intended that the scope of the present disclosure be defined by the Claims appended hereto and their equivalents.

What is claimed is:

1. A switch apparatus, comprising:
- a base module including a base case, and a moving magnet movably mounted in the base case; and
- a manipulation module including a manipulation case, and a first magnet fixedly mounted in the manipulation case,
- wherein the moving magnet moves between a hold position and a releasable position,
- wherein the hold position refers to a position in which the manipulation module is held onto the base module as an attractive force acts between the moving magnet and the first magnet,
- wherein the releasable position refers to a position in which the manipulation module is releasable from the base module as a repulsive force acts between the moving magnet and the first magnet, and
- wherein a magnetic axis of the moving magnet is parallel to a plane of the base case.

2. The switch apparatus of claim 1,
- wherein the moving magnet includes a first portion and a second portion including opposite magnetic polarities to each other.

3. The switch apparatus of claim 2,
- wherein the first magnet is positioned above a movement path of the moving magnet,
- wherein the first magnet includes a first portion and a second portion having opposite magnetic polarities to each other, and
- wherein a magnetic axis of the first magnet is perpendicular to the magnetic axis of the moving magnet.

4. The switch apparatus of claim 3,
- wherein the first portion of the first magnet and the first portion of the moving magnet have a same magnetic polarity, and
- wherein the second portion of the first magnet and the second portion of the moving magnet have a same magnetic polarity.

5. The switch apparatus of claim 3,
- wherein the second portion of the first magnet faces the movement path of the moving magnet, and
- wherein when the moving magnet is in the hold position, the second portion of the first magnet faces the first portion of the moving magnet.

6. The switch apparatus of claim 5, wherein when the moving magnet is in the releasable position, the second portion of the first magnet faces the second portion of the moving magnet.

7. The switch apparatus of claim 3,
- wherein the base module further includes a first electromagnet and a second electromagnet disposed to face each other on a first side and a second side of the moving magnet,
- wherein the first electromagnet faces the first portion of the moving magnet,
- wherein the second electromagnet faces the second portion of the moving magnet, and
- wherein as a direction of a current applied to the first electromagnet and the second electromagnet is changed, a magnetic polarity of the first electromagnet and a magnetic polarity of the second electromagnet are changed.

8. The switch apparatus of claim 7, wherein when the magnetic polarity of the first electromagnet and the magnetic polarity of the second electromagnet are changed to be a same as the magnetic polarity of the first portion of the moving magnet, the moving magnet moves to the hold position.

9. The switch apparatus of claim 7, wherein when the magnetic polarity of the first electromagnet and the magnetic polarity of the second electromagnet are changed to be a same as the magnetic polarity of the second portion of the moving magnet, the moving magnet moves to the releasable position.

10. The switch apparatus of claim 1,
- wherein the base module further includes a stationary magnet spaced from the moving magnet,
- wherein the manipulation module further includes a second magnet positioned above the stationary magnet, and
- wherein an attractive force is continuously generated between the second magnet and the stationary magnet.

11. The switch apparatus of claim 10, wherein a magnetic axis of the second magnet is perpendicular to a magnetic axis of the stationary magnet.

12. The switch apparatus of claim 1,
- wherein the base case further includes a guide member defining a movement path of the moving magnet, and
- wherein the guide member includes a first restricting projection and a second restricting projection and the moving magnet is disposed between the first restricting projection and the second restricting projection so that a position of the moving magnet is restricted to the hold position and the releasable position by the first restricting projection and the second restricting projection.

* * * * *